United States Patent [19]

Ogawa et al.

[11] Patent Number: 4,911,951
[45] Date of Patent: Mar. 27, 1990

[54] METHOD FOR MANUFACTURING MAGNETIC RECORDING MEDIUM

[75] Inventors: Hiroshi Ogawa; Shinji Saito; Makoto Yoshimura; Shinichi Funabashi, all of Kanagawa, Japan

[73] Assignee: Fuji Photo Film Co., Ltd., Kanagawa, Japan

[21] Appl. No.: 250,586

[22] Filed: Sep. 29, 1988

[30] Foreign Application Priority Data

Sep. 29, 1987 [JP] Japan .................. 62-242675

[51] Int. Cl.$^4$ .................................. H01F 10/02
[52] U.S. Cl. ............................ 427/130; 427/131; 427/132; 428/694; 428/900
[58] Field of Search ............ 427/130, 131, 132; 428/694, 900

Primary Examiner—Bernard Pianalto
Attorney, Agent, or Firm—Sughrue, Mion, Zinn, Macpeak & Seas

[57] ABSTRACT

A method for manufacturing a magnetic recording medium comprising the steps of: (1) providing a lower layer comprising a ferromagnetic powder dispersed in a binder on a non-magnetic support and (2) providing an upper layer comprising a ferromagnetic powder dispersed in a binder on the lower layer, wherein a solvent used in a magnetic coating composition for the lower layer contains at least 30 wt % of an organic solvent having an evaporation rate index of less than 50; a solvent used in a magnetic coating composition for the upper layer contains from 0 to 40 wt % of an organic solvent having an evaporation rate index of less than 50; the content of an organic solvent having an evaporation rate index of less than 50 in the coating composition for the upper layer is smaller than that in the coating composition for the lower layer; the magnetic coating composition for the upper layer is coated while the lower layer is not dried; and when the lower and upper layers are dried until the total solvent content of the lower and upper layers is in the range of from 0.05 to 3 wt %, a calendering treatment is carried out.

7 Claims, 1 Drawing Sheet

METHOD FOR MANUFACTURING MAGNETIC RECORDING MEDIUM

FIELD OF THE INVENTION

The invention concerns a method for manufacturing magnetic recording media such as magnetic tapes, magnetic sheets, magnetic discs, etc., and, more precisely, it concerns a method for manufacturing magnetic recording media wherein the surface of the magnetic layer has excellent smoothness.

BACKGROUND OF THE INVENTION

Magnetic recording media are generally manufactured by forming a magnetic layer by coating a magnetic coating composition comprising a dispersion of magnetic particles and a binding agent (binder) in a solvent onto a non-magnetic support (referred to simply as a support hereafter) and then subjecting the magnetic layer to various treatments. These treatments generally include a calendering treatment, and this is carried out in oder to improve the smoothness, etc., of the surface of the magnetic layer.

However, since conventional calendering treatment has been carried out after hardening the magnetic layer, effective treatment has been impossible.

More recently calendering at a stage where the solvent content of the magnetic layer is at an appropriate level has been suggested, as disclosed, e.g., in JP-A-57143737 and 61-261819, but in such cases problems may arise with peeling and shedding of the magnetic layer and with sticking to the calendering roll. (The term "JP-A" as used herein means an "unexamined published Japanese patent application".)

Further, multi-layer coatings are known, as disclosed, e.g., in JP-A-48-98803 and 61-39829, but a method of manufacture in which calendering can be carried out effectively even with such multi-layer coating is desirable.

SUMMARY OF THE INVENTION

This invention is based upon an understanding of the problems described above.

An object of this invention is to provide a method for manufacturing magnetic recording media in which the smoothness of the magnetic layer is effectively increased in multi-layer coating.

Other objects and effects of this invention will be apparent from the following description.

The above objects of this invention is achieved by a method for manufacturing a magnetic recording medium comprising the steps of: (1) providing a lower layer comprising a ferromagnetic powder dispersed in a binder on a non-magnetic support and (2) providing an upper layer comprising a ferromagnetic powder dispersed in a binder on the lower layer, wherein a solvent used in a magnetic coating composition for the lower layer contains at least 30 wt% of an organic solvent having an evaporation rate index of less than 50; a solvent used in a magnetic coating composition for the upper layer contains from 0 to 40 wt% of an organic solvent having an evaporation rate index of less than 50; the content of an organic solvent having an evaporation rate index of less than 50 in the coating composition for the upper layer is smaller than that in the coating composition for the lower layer; the magnetic coating composition for the upper layer is coated while the lower layer is not dried; and when the lower and upper layers are dried until the total solvent content of the lower and upper layers is in the range of from 0.05 to 3 wt%, a calendering treatment is carried out.

DETAILED DESCRIPTION OF THE INVENTION

Figure 1:
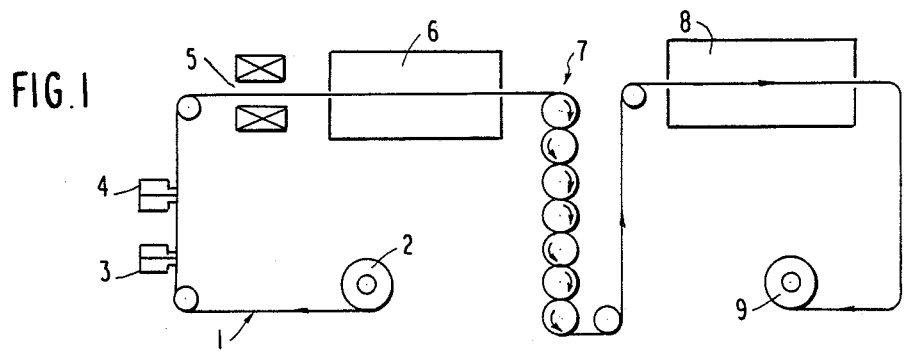
FIGS. 1 and 2 each shows a schematic view of one embodiment of the method of manufacturing a magnetic recording medium according to this invention.

The term "evaporation rate index" as used herein means the ratio of the evaporation rate when the evaporation rate of n-butyl acetate is taken to be 100.

If the evaporation rate index is E, the vapor pressure of the solvent is P (mm Hg) and the molecular weight of the solvent is M, and if the vapor pressure at 20° C. is taken as a standard, then the equation for E is $E=0.11 PM$, while with the vapor pressure at 30° C., the equation for E is $E=0.054 PM$.

Organic solvents which have an evaporation rate index of less than 50 include methylcellosolve, cellosolve, butycellosolve, ethyl n-butyl ketone, diisobutyl ketone, cyclohexanone, isophorone, etc. Of these, cyclohexanone is especially preferred.

The organic solvent in the coating composition of the lower layer contains at least 30 wt%, and preferably from 30 to 80 wt%, more preferably from 40 to 70 wt%, especially preferably from 45 to 65 wt%, of an organic solvent having an evaporation rate index of less than 50. If the content of such solvent is less than 30 wt%, the solvent content of the lower layer is too low during the calendering. This is undesirable in that the surface properties of the upper layer are not improved after calendering.

The organic solvent in the coating composition of the upper layer contains from 0 to 40 wt%, preferably from 0 to 35 wt%, more preferably from 0 to 30 wt%, of an organic solvent having an evaporation rate index of less than 50. The content of such an organic solvent in the coating composition for the upper layer is preferably smaller to 5 wt% or more than that in the coating composition for the lower layer.

A calendering treatment is carried out when the upper and lower layers are dried until the total solvent content of the upper and lower layer is in the range of from 0.05 to 3 wt%, preferably from 0.1 to 3 wt%, and more preferably from 0.1 to 1 wt%.

If the content of the organic solvent having an evaporation rate index of less than 50 in the coating composition of the lower layer is less than that of the upper layer coating composition, the solvent content on calendering will be greater in the upper layer than the lower layer and so problems with peeling of the magnetic layer and sticking to the calendering roll are liable to occur during the calendering treatment and this is undesirable. Therefore, the multi-layer coated layer in this invention (including the lower and upper layers) is such that drying proceeds in such a way that the upper layer does not stick to the calendering roll etc. in the state in which calendering is carried out, while the lower layer dries more slowly than the upper layer so that the lower layer is still in a comparatively soft state on calendering.

Hence, the multi-layer coated layer of this invention can be provided with a higher degree of surface smoothness very easily by pressing in the conventional way with a calendering roll while sticking of the coated layer to the calendering roll and peeling can be avoided, and the calendering treatment can be carried out effectively.

Fine ferromagnetic powder is used in the magnetic layer of the magnetic recording media of this invention.

Known conventional fine ferromagnetic powders, for example, $\gamma$-$Fe_2O_3$, cobalt-containing $\gamma$-$Fe_2O_3$, $Fe_3O_4$, cobalt containing $Fe_3O_4$, $\gamma$-$FeO_x$, cobalt-containing $\gamma$-$FeO_x$ ($x=1.33$–$1.50$), cobalt-nickel-phosphorus alloys, cobalt-nickel-iron-born alloys, iron-nickel-zinc alloys, nickel-cobalt alloys, cobalt-nickel-iron alloys, etc. can be used. The particle size of the fine ferromagnetic powder is preferably such that the length of the particles is from 0.005 to 1 $\mu$m and the ratio of the axial length/axial width is of the order of from 1/1 to 50/1. Furthermore, the specific surface area of these fine ferromagnetic powders is preferably from about 1 to 70 $m^2/g$.

Tabular hexagonal crystals of barium ferrite can also be used for the fine ferromagnetic powder in this invention. The particle size of the barium ferrite is preferably such that the particles have a diameter of from 0.001 to 1 $\mu$m and a thickness of from $\frac{1}{2}$ to 1/20 of the diameter. The density of the barium ferrite is preferably from 4 to 6 g/cc, and the specific surface area is preferably from 1 to 70 $m^2/g$.

Among the above ferromagnetic powders, cobalt-containing $\gamma$-$Fe_2O_3$ and alloys containing iron as a main component are particularly preferred.

Ferromagnetic powders described in U.S. Pat. Nos. 3,020,215, 3,031,341, 3,100,194, 3,242,005, 3,389,014, etc. may also be used in this invention.

A binder is used together with the fine ferromagnetic powder in the magnetic layers in this invention. The binders used include the thermoplastic resins, thermosetting resins, reactive resins and mixtures of such resins known in the art.

The thermoplastic resins preferably have a softening temperature of not more than 150° C., an average molecular weight of from 10,000 to 300,000 and a degree of polymerization of from 20 to 2,000. The thermoplastic resins which can be used for this purpose include, for example, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid-vinylidene chloride copolymers, methacrylic acid ester-styrene copolymer, urethane elastomers, nylon-silicon based resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (e.g., cellulose acetate butyrate, cellulose diacetate, cellulose triacetate, cellulose propionate, nitrocellulose, etc.), styrene-butadiene copolymers, polyester resins, chlorovinyl ether-acrylic acid copolymers, amino resins, various synthetic rubber based thermoplastic resins, and mixtures of these materials.

Thermosetting resins or reactive resins preferably have a molecular weight of less than 200,000 in the coating composition, and on heating after coating and drying the coating composition, the resins undergo condensation or addition reactions and infinitely large molecular weights are attained. Of these resins, those which do not soften or melt prior to thermal decomposition are preferred. Actual examples include phenol resins, epoxy resins, hardening type polyurethane resins, urea resins, melamine resins, alkyd resins, silicon resins, reactive acrylic resins, epoxy-polyamide resins, nitrocellulose-melamine resins, mixtures of high molecular weight polyester resins and isocyanate prepolymers, mixtures of methacrylic acid salt copolymers and diisocyanate prepolymers, mixtures of polyester polyols and polyisocyanates, urea-formaldehyde resins, mixtures of low molecular weight glycol, high molecular weight diol and triphenylmethane triisocyanate, polyamine resins, and mixtures of these materials.

Among the above binders, mixtures of a vinyl chloride based copolymer, a polyurethane and, optionally, an isocyanate compound are particularly preferred.

Binders described in U.S. Pat. Nos. 3,144,353, 3,320,090, 3,437,510, 3,597,273. 3,781,210, 3,781,211, 3,713,887, 3,499,789, 3,419,420, 3,144,352, 4,409,291, etc. may also be used in this invention.

The support on which the magnetic layers are formed may be a plastic film consisting of a polyester such as polyethylene terephthalate, polyethylene naphthalate etc., a polyolefin such as polypropylene, a cellulose derivative such as cellulose triacetate, cellulose diacetate, etc., vinyl based resins such as polyvinyl chloride, a polycarbonate, a polyamide or a polysulfone etc.; or a metal such as aluminum, copper, etc.; or a ceramic such as glass; etc.

These supports may be subjected to a conventional pre-treatment such as a corona discharge treatment, a plasma treatment, an undercoating treatment, a heat treatment, a metal vapor deposition treatment, an alkali treatment, etc.

The support may have a variety of prescribed forms. The thickness of the support in this invention is preferably from 4 to 100 $\mu$m, more preferably from 6 to 40 $\mu$m.

Supports described in U.S. Pat. Nos. 3,546,030, 3,627,579, 4,708,902, 4,693,932, 4,603,073, 4,508,782, 4,071,654, etc. may also be used in this invention.

After completing the dispersion process, the coating composition for forming the magnetic layer can be coated on the support using various coating methods, for example, air doctor coating, blade coating, air knife coating, squeeze coating, dip coating, reverse roll coating, transfer roll coating, gravure coating, kiss coating, spray coating, etc.

The total solvent convent of the upper and lower layers of from 0.05 to 3 wt% can be attained, for example, by drying under the condition of the drying temperature of from 40° to 120° C., the air velocity of from 1 to 20 m/sec, and the drying time of from 30 to 300 sec.

Figure 2:
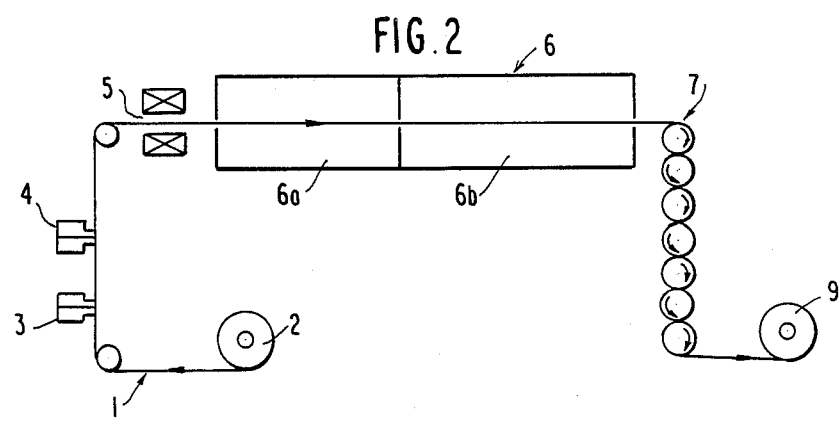

The actual examples of the processes involved in the method of this invention are as shown in FIGS. 1 and 2. The schematic drawings shown here are simply examples, and that shown in FIG. 1 will be described first.

Common figures denote common elements unless otherwise indicated.

The extended support 1 which has been wound up in the form of a roll is fed at a fixed speed (100–600 m/min) from a feeding roll 2, and in the initial stage, the lower layer is coated form a first coating head 3 and then the upper layer is coated by means of a second coating head 4, the coating being carried out continuously. Subsequently, the coated support is subjected to an orientating treatment, as required, in orientating means 5 and then a drying treatment based upon this invention is carried out in drying means 6 (the drying treatment can be carried out by directing a drying air current at a temperature of from 30° to 130° C. and of velocity from 1 to 100 m/min either parallel to, or perpendicular to, the coated layer, by means of an infrared heater, or by means of high frequency induction, etc.). The material thus coated and dried is then subjected immediately to a calendering treatment in the calendering means 7 and then dried completely at a temperature of from 50° to 150° C. in the second drying means 8 and wound up by means of the winding up role 9.

In the process shown in FIG. 2, the material is not dried again after the calendering treatment, as in the case shown in FIG. 1, but the drying means 6 which is established before the calendering means is constructed with two chambers, for example, a first drying chamber 6a and a second drying chamber 6b, so that the drying treatment can be controlled more accurately.

The upper and lower layer coating compositions of this invention are preferably coated by simultaneous coating in which the lower layer is coated and then the upper layer is coated before the lower layer is dried.

The upper and lower layers coating compositions of this invention may be coated by the wet-on-wet coating method as described, e.g., JP-A-61-139929.

If the upper layer is coated after the lower layer has been dried and completely hardened, the lower layer may be swelled or dissolved by the organic solvent in the upper layer, and not only is it difficult to coat the upper layer with a uniform thickness under these conditions, but it is also difficult to achieve the effect of the invention as described above. Furthermore, it is also difficult to reduce the dry thickness of the upper layer to 2 $\mu$m or less.

The calendering treatment used in this invention may be a conventional treatment carried out by pressing and heating with two or more metal rolls or a combination of metal rolls and elastic rolls made, e.g., of plastics, passing the magnetic recording medium between the rolls and improving the surface properties (gloss, surface roughness, etc.) of the magnetic layer. In this invention, the calendering treatment is carried out after coating the magnetic material onto the support in the way described aobve and drying, at the time when the organic solvent in the coating composition of the lower layer is in the course of drying and the upper layer is already dry. The treatment is preferably carried out continuously when the surface temperature of the magnetic film is raised to at least 50° C. The surface temperature on calendering is preferably 120° C. or less in view of the dimension stability of the support.

If the calendering is carried out after completely drying the upper and lower magnetic layers and temporarily winding up the material, the magnetic layer becomes too hard and this is undesirable since the improvement in the surface properties of the magnetic layer resulting form the calendering treatment is slight.

The calendering treatment is preferably carried out either during the drying step or immediately after drying.

The calendering roll temperature is preferably from 50° to 150° C., and more particularly from 50° to 110° C. At temperatures below 50° C., there is no increase in the softness of the magnetic layer and it is difficult to improve the surface properties, and if the temperature exceeds 150° C. then deformation, shrinkage or elongation of the support generally occur and this is undesirable.

The linear pressure of the calendering treatment is preferably from 80 to 500 kg/cm, more preferably from 100 to 500 kg/cm, and particularly preferably from 100 to 300 kg/cm. At linear pressures below 80 kg/cm, it is difficult to realize the effect of the pressure and to obtain any improvement in the surface properties of the magnetic layer and this is undesirable. Furthermore, if the line pressure exceeds 500 kg/cm then the mechanical strength of the calendering machine may be inadequate and deformation of the support is liable to occur, and it is generally undesirable from the point of the maintenance of the equipment.

The feed rate of the magnetic recording medium is preferably from 100 to 1,000 m/min.

Calendering treatments described in U.S. Pat. Nos. 2,688,567, 2,998,325, 3,783,023, etc. may also be used in this invention.

The dry thickness of the upper layer in this invention is preferably from 0.1 to 1.5 $\mu$m, and more preferably from 0.3 to 1 $\mu$m, and the upper layer is preferably thinner than the lower layer. The dry thickness of the upper layer is more preferably ½ or less of the dry thickness of the lower layer.

As described above, the method of manufacture of this invention involves forming the magnetic layer as a multi-layer coated layer; and by making use of the fact that the rates of evaporation of the solvents in each layer are different, the upper layer is made of dry at a faster rate than the lower layer; and when the calendering treatment is carried out, the upper layer which is in direct contact with the calendering roll has dried to such an extent that it does not stick to the roll and peel away, while the lower layer has dried to a lesser extent so that the progress of hardening in the lower layer has been suppressed and it retains an ideal softness for the calendering process. By these procedures, the calendering treatment can be carried out under ideal conditions, i.e., both effectively and without the occurrence of layer peeling, which are two factors with which difficulties were experienced in the prior art. Hence, it is possible to provide magnetic recording media which are furnished with a magnetic layer which have good surface smoothness and which provide superior electromagnetic conversion characteristics, etc.

This invention is described in more detail below by referring to examples, but is not construed as being limited thereto. Unless otherwise indicated, all parts, percents, ratios, etc. are by weight.

EXAMPLE

The formulation for the lower layer coating composition was as shown below.

| | |
|---|---|
| Co—FeO$_x$ (x = 1.44, Hc = 800 Oe, specific surface area 40 m$^2$/g) | 100 parts by weight |
| Vinyl chloride/vinyl acetate copolymer containing 10$^{-4}$ mol/g of sulfonic acid groups (polymerization degree: 400, vinyl chloride/vinyl acetate = 95/5 by weight) | 15 parts by weight |
| Polyester polyurethane (molecular weight: 50,000) | 5 parts by weight |
| Polyisocyanate ("Coronate L-75") | 6.7 parts by weight |
| Butoxyethylstearate (industrial grade) | 4 parts by weight |
| Oleic acid (industiral grade) | 1 part by weight |
| Carbonn (particle size 20 m$\mu$) | 3 parts by weight |
| Cyclohexanone/methyl ethyl ketone | 200 parts by weight |

-continued solvent mixture (proportions as
shown in table 1)

The formulation for the upper layer coating composition was as shown below.

| | |
|---|---|
| Co—Fe$O_x$ (x = 1.44, Hc = 800 Oe, Specific surface area 60 m$^2$/g) | 100 parts by weight |
| Vinyl chloride/vinyl acetate copolymer containing 10$^{-4}$ mol/g of sulfonic acid groups (polymerization degree: 400, vinyl chloride/vinyl acetate = 95/5 by weight) | 15 parts by weight |
| Polyester polyurethane (molecular weight: 50,000) | 5 parts by weight |
| Butoxyethylstearate (industrial grade) | 1 part by weight |
| Oleic acid (industrial grade) | 1 part by weight |
| α-Alumina (particle size 0.3 μm) | 2 parts by weight |
| Carbon (particle size 100 μm) | 1 part by weight |
| Cyclohexanone/methykl ethyl ketone solvent mixture (proportions as shown in table 1) | 200 parts by weight |

The lower and upper layer coating composition of which formulations are indicated above were simultaneously coated at a coating speed of 300 m/min in such a way as to provide a lower layer thickness after drying of 3.5 μm and an upper layer thickness after drying of 0.5 μm, orientation was carried out before the coated layers were dried, and the layers were dried by means of a perpendicular draft of velocity 20 m/min at a drying temperature of 100° C. The temperature of the coated layer during drying was monitored with an infrared temperature gauge and an in-line calendering treatment was carried out with calendering rolls which were all made of metal at a temperature of 80° C. at a pressure of 300 kg/cm at the time with the coated layer temperature of the surface layer was above 50° C.

A bulk thermal treatment was carried out to harden the coated layers after the calendering treatment, and the material was slit into half inch widths to provide video tapes. The characteristics of the video tapes obtained were as shown in Table 1.

The evaporation rate indices of cyclohexanone was 23 and that of Methyl ethyl ketone was 572 according to "Paint Fluidity and Pigment Dispersion", by T. C. Patton.

TABLE 1

| Sample* | Lower Layer Cyclohexanone/ MEK (wt. %) | Upper Layer Cyclohexanone/ MEK (wt. %) | Gloss (%) | 6 MHzVS (dB) | YC/N (dB) |
|---|---|---|---|---|---|
| C.E. A | 10/80 | 20/80 | 195 | 0.0 | 0.0 |
| Ex. 1 | 30/70 | 20/80 | 225 | +1.2 | +1.3 |
| Ex. 2 | 40/60 | 20/80 | 230 | +1.5 | +1.6 |
| C.E. B | 20/80 | 30/70 | 190 | −0.3 | −0.4 |
| Ex. 3 | 30/70 | 30/70 | 220 | +1.1 | +1.2 |
| Ex. 4 | 40/60 | 30/70 | 225 | +1.2 | +1.2 |
| C.E. C | 20/80 | 40/60 | 180 | −0.7 | −0.6 |
| C.E. D | 30/70 | 40/60 | 190 | −0.4 | −0.5 |
| Ex. 5 | 40/60 | 40/60 | 215 | +0.8 | +0.7 |

*C.E. = Comparative Example, Ex. = Example

The methods for measuring the video tape characteristics were as follows.

Gloss (%): The gloss at 45°, 45° when light was directed along the length of the tape was measured using a glossimeter, the value being corrected with a standard black gloss plate. (Measuring apparatus: Suga Tester GK-45D.)

6MHzVS (dB): Playback output at 6 MHz when a video signal had been recorded at the optimum recording current. (Measuring apparatus: BR-7000, made by JVC.)

YC/N (dB): Ratio of the 6 MHz video signal and the modulation noise emission at 5 MHz.

Figure 3:
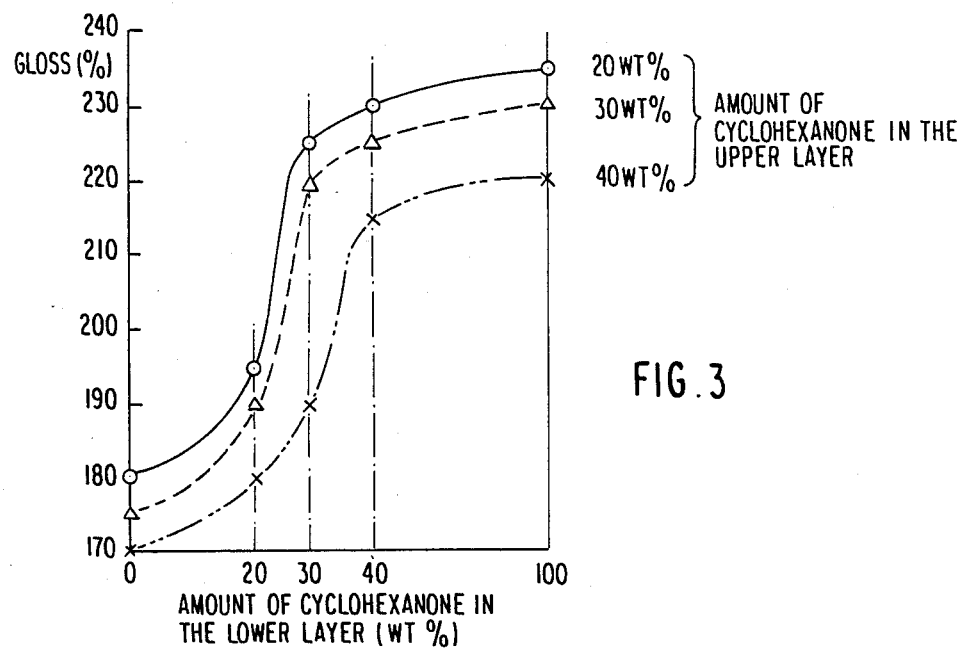
FIG. 3 is a graph showing a dependence of the gloss on the content of cyclohexanone in the solvent of the coating composition for the upper layer and that for the lower layer.

Moreover, a graph showing the gloss obtained by changing the amounts of cyclohexanone in the upper and lower layers are shown in FIG. 3.

It is clear from Table 1 and FIG. 3 that the magnetic recording media shown in Examples 1 to 5 in which the lower layer contained at least 30 wt% of an organic solvent having an evaporation index of less than 50 (cyclohexanone) had a magnetic layer of higher gloss and better surface smoothness than the magnetic recording media of Comparative Example A to D in which the amount of such a solvent in the lower layer was less than 30 wt%. Consequently, better results were obtained for VS and YC/N. It is understood that this is because when, as described above, the lower layer contains at least 30 wt% of an organic solvent having an evaporation index of less than 50, the drying rate of the layers as a whole is slower during the drying of the upper and lower layers so that there is adequate leveling and elimination of strain within the lower layer, and the surface properties of the magnetic layer after drying are improved. Furthermore, this is because the calendering treatment is carried out with the magnetic layer in a soft condition because of the larger solvent content of the whole layers.

Further, the magnetic recording medium in each of the Comparative Examples had a larger proportion of organic solvent having an evaporation index of less than 50 in the upper layer than in the lower layer, and the resulting media had low gloss and the magnetic layer surface properties were fairly poor. It is understood that this is due to strain in the lower layer and inadequate leveling resulting from the lower layer drying out more rapidly than the upper layer.

Further, it is understood that such results are observed because the solvent content of the whole layer is low since the lower layer is thicker than the upper layer, and since the magnetic layer is harder at the time of the calendering treatment.

While the invention has been described in detail and with reference to specific embodiments thereof, it will be apparent to one skilled in the art that various changes and modifications can be made therein without departing from the spirit and scope thereof.

What is claimed is:

1. A method for manufacturing a magnetic recording medium comprising the steps of: (1) providing a lower layer comprising a ferromagnetic powder dispersed in a binder on a non-magnetic support and (2) providing an upper layer comrising a ferromagnetic powder dispersed in a binder on said lower layer, wherein a solvent used in a magnetic coating composition for said lower layer contains at least 30 wt% of an organic solvent having an evaporation rate index of less than 50; a solvent used in a magnetic coating composition for said upper layer contains from 0 to 40 wt% of an organic solvent having an evaporation rate index of less than 50; the content of an organic solvent having an evaporation rate index of less than 50 in said coating composition for said upper layer is smaller than that in said coating composition for said lower layer; said magnetic coating composition for said upper layer is coated while said lower layer is not dried; and when said lower and upper layers are dried until the total solvent content of said lower and upper layers is in the range of from 0.05 to 3 wt%, a calendering treatment is carried out.

2. A method for manufacturing a magnetic recording medium as claimed in claim 1, wherein said calendering treatment is carried out either during the drying step or immediately after drying.

3. A method for manufacturing a magnetic recording medium as claimed in claim 1, wherein said calendering treatment is carried out when the surface temperature of said upper layer is at least 50° C., and with a linear pressure of from 100 to 500 kg/cm.

4. A method for manufacturing a magnetic recording medium as claimed in claim 1, wherein the thickness of said upper layer is thinner than the thickness of said lower layer.

5. A method for manufacturing a magnetic recording medium as claimed in claim 1, wherein said organic solvent having an evapoaration rate index of less than 50 is cyclohexanone.

6. A method for manufacturing a magnetic recording medium as claimed in claim 1, wherein said magnetic coating composition for said lower layer contains from 40 to 70 wt% of said organic solvent having an evaporation rate index of less than 50.

7. A method for manufacturing a magnetic recording medium as claimed in claim 4, wherein the thickness of said upper layer is at most 1.5 μm.

* * * * *